United States Patent
Adams

(10) Patent No.: US 7,633,559 B2
(45) Date of Patent: Dec. 15, 2009

(54) INTERLACE MOTION ARTIFACT DETECTION USING VERTICAL FREQUENCY DETECTION AND ANALYSIS

(75) Inventor: Dale R. Adams, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 219 days.

(21) Appl. No.: 11/932,808

(22) Filed: Oct. 31, 2007

(65) Prior Publication Data
US 2008/0122974 A1    May 29, 2008

Related U.S. Application Data

(60) Division of application No. 11/054,748, filed on Feb. 9, 2005, now Pat. No. 7,391,481, which is a division of application No. 09/941,949, filed on Aug. 28, 2001, now Pat. No. 6,909,469, which is a continuation-in-part of application No. 09/372,713, filed on Aug. 11, 1999, now Pat. No. 6,489,998.

(51) Int. Cl.
H04N 5/14   (2006.01)
G06F 15/00   (2006.01)
(52) U.S. Cl. ..................... 348/701; 708/404
(58) Field of Classification Search ............... None
See application file for complete search history.

(56) References Cited

U.S. PATENT DOCUMENTS

| | | | |
|---|---|---|---|
| 4,002,827 A | | 1/1977 | Nevin et al. |
| 4,091,419 A | * | 5/1978 | Rhee et al. ............ 348/673 |
| 4,164,021 A | * | 8/1979 | Nishitani et al. ......... 708/405 |
| 4,689,675 A | | 8/1987 | Tchorbajian |
| 4,689,762 A | * | 8/1987 | Thibodeau, Jr. ......... 708/409 |
| 4,731,660 A | | 3/1988 | Faroudja et al. |
| 4,790,028 A | | 12/1988 | Ramage |
| 4,868,776 A | * | 9/1989 | Gray et al. ............ 708/405 |
| 4,876,596 A | | 10/1989 | Faroudja |
| 4,881,125 A | | 11/1989 | Drause |

(Continued)

FOREIGN PATENT DOCUMENTS

WO    WO00/16561    3/2000

OTHER PUBLICATIONS

Micron Technology Inc., "*Technical Note,*" Achieve Maximum Compatibility in SDRAM/SGRAM Design, (1997), 6 pgs.

(Continued)

*Primary Examiner*—Paulos M Natnael
(74) *Attorney, Agent, or Firm*—Perkins Coie LLP

(57) ABSTRACT

An interlace motion artifact detector which identifies video image spatial frequencies characteristic of motion artifacts. The detected frequency is the maximum which can be represented by the vertical sampling rate of the video format (i.e., the Nyquist frequency). This frequency is detected by a pair of partial Discrete Fourier Transforms (DFT) which each calculate only the frequency component of interest. Additional vertical frequency components at one half and one quarter the interlace motion artifact frequency are also detected via a partial DFT. The presence of these lower frequencies acts as an indication of an erroneous motion artifact detection. Additionally, the dynamic range and maximum level of the video data is used as an indication of when to boost the frequency detection levels in areas of low brightness and/or contrast.

16 Claims, 4 Drawing Sheets

Frequency Detector Signal Flow Block Diagram

U.S. PATENT DOCUMENTS

| | | | |
|---|---|---|---|
| 4,937,667 A | 6/1990 | Choquet et al. | |
| 4,959,715 A | 9/1990 | Prodan | |
| 4,982,280 A | 1/1991 | Lyon et al. | |
| 4,989,090 A | 1/1991 | Campbell et al. | |
| 4,998,287 A | 3/1991 | Katznelson et al. | |
| 5,014,119 A | 5/1991 | Faroudja | |
| 5,257,103 A | 10/1993 | Vogeley et al. | |
| 5,291,275 A | 3/1994 | Lumelsky | |
| 5,291,280 A | 3/1994 | Faroudja et al. | |
| 5,299,029 A | 3/1994 | Moriya et al. | |
| 5,317,240 A | 5/1994 | Keller | |
| 5,347,314 A | 9/1994 | Faroudja et al. | |
| 5,428,398 A | 6/1995 | Faroudja | |
| 5,444,493 A | 8/1995 | Boie | |
| 5,448,554 A | 9/1995 | Van Steenbrugge | |
| 5,469,216 A | 11/1995 | Takahashi et al. | |
| 5,471,577 A | 11/1995 | Lightbody et al. | |
| 5,473,383 A | 12/1995 | Sezan et al. | |
| 5,488,422 A | 1/1996 | Faroudja et al. | |
| 5,521,644 A | 5/1996 | Sezan et al. | |
| 5,530,484 A | 6/1996 | Bhatt et al. | |
| D371,357 S | 7/1996 | Nakamura | |
| 5,532,750 A | 7/1996 | De Haan et al. | |
| 5,532,751 A | 7/1996 | Lui | |
| 5,543,858 A | 8/1996 | Wischermann | |
| 5,550,592 A | 8/1996 | Markandey et al. | |
| 5,563,651 A | 10/1996 | Christopher et al. | |
| 5,600,731 A | 2/1997 | Sezan et al. | |
| 5,602,654 A | 2/1997 | Patti et al. | |
| 5,606,373 A | 2/1997 | Dopp et al. | |
| 5,619,272 A | 4/1997 | Salmon et al. | |
| 5,621,470 A | 4/1997 | Sid-Ahmed | |
| 5,625,421 A | 4/1997 | Faroudja et al. | |
| 5,661,525 A | 8/1997 | Kovacevic et al. | |
| 5,689,301 A | 11/1997 | Christopher et al. | |
| 5,706,451 A | 1/1998 | Lightbody et al. | |
| 5,748,250 A | 5/1998 | Markandey et al. | |
| 5,754,248 A | 5/1998 | Faroudja | |
| 5,771,331 A | 6/1998 | Aoki et al. | |
| 5,784,115 A * | 7/1998 | Bozdagi | 348/452 |
| 5,793,435 A | 8/1998 | Ward et al. | |
| 5,838,381 A | 11/1998 | Kasahara et al. | |
| 5,839,161 A | 11/1998 | Liang | |
| 5,844,627 A | 12/1998 | May et al. | |
| 5,852,473 A | 12/1998 | Horne et al. | |
| 5,856,930 A | 1/1999 | Hosono | |
| 5,963,261 A | 10/1999 | Dean | |
| 6,014,182 A | 1/2000 | Swartz | |
| 6,034,733 A | 3/2000 | Bairam et al. | |
| 6,040,873 A | 3/2000 | Izumi et al. | |
| 6,055,018 A * | 4/2000 | Swan | 348/448 |
| 6,058,140 A | 5/2000 | Smolenski | |
| 6,061,705 A * | 5/2000 | Hellberg | 708/408 |
| 6,064,450 A | 5/2000 | Canfield et al. | |
| 6,104,755 A | 8/2000 | Ohara | |
| 6,166,772 A | 12/2000 | Voltz et al. | |
| 6,222,589 B1 | 4/2001 | Faroudja et al. | |
| 6,266,092 B1 | 7/2001 | Wang et al. | |
| 6,269,484 B1 | 7/2001 | Simsic et al. | |
| 6,295,041 B1 | 9/2001 | Leung et al. | |
| 6,297,848 B1 | 10/2001 | Westerman | |
| 6,298,144 B1 | 10/2001 | Pucker, II et al. | |
| 6,351,759 B1 * | 2/2002 | Moretti et al. | 708/405 |
| 6,380,978 B1 | 4/2002 | Adams et al. | |
| 6,392,712 B1 | 5/2002 | Gryskiewicz et al. | |
| 6,437,835 B1 | 8/2002 | Sakamoto | |
| 6,456,329 B1 | 9/2002 | Tinker et al. | |
| 6,489,998 B1 * | 12/2002 | Thompson et al. | 348/452 |
| 6,504,577 B1 | 1/2003 | Voltz et al. | |
| 6,515,706 B1 | 2/2003 | Thompson et al. | |
| 6,542,197 B1 | 4/2003 | Ko | |
| 6,542,198 B1 | 4/2003 | Hung et al. | |
| 6,545,719 B1 | 4/2003 | Topper | |
| 6,567,097 B1 | 5/2003 | Iwaki | |
| 6,577,345 B1 | 6/2003 | Lim et al. | |
| 6,603,815 B2 | 8/2003 | Suzuki et al. | |
| 6,847,405 B2 | 1/2005 | Hsu et al. | |
| 6,867,814 B2 | 3/2005 | Adams et al. | |
| 6,909,469 B2 * | 6/2005 | Adams | 348/700 |
| 7,023,487 B1 * | 4/2006 | Adams | 348/448 |
| 7,027,099 B2 * | 4/2006 | Thompson et al. | 348/448 |
| 7,129,990 B2 * | 10/2006 | Wredenhagen et al. | 348/449 |
| 7,295,715 B2 * | 11/2007 | Jung et al. | 382/254 |
| 7,391,481 B2 * | 6/2008 | Adams | 348/700 |
| 7,499,103 B2 * | 3/2009 | Thompson et al. | 348/448 |
| 2001/0016009 A1 | 8/2001 | Hurst | |
| 2002/0109790 A1 | 8/2002 | Mackinnon | |
| 2003/0098924 A1 | 5/2003 | Adams et al. | |

OTHER PUBLICATIONS

Micron Technology Inc., "*Synchronous DRAM,*" 16 MEG: x 16 SDRAM, (1997), 46 pgs.

\* cited by examiner

Figure 2: Step Function Spatial Domain and Frequency Domain Response
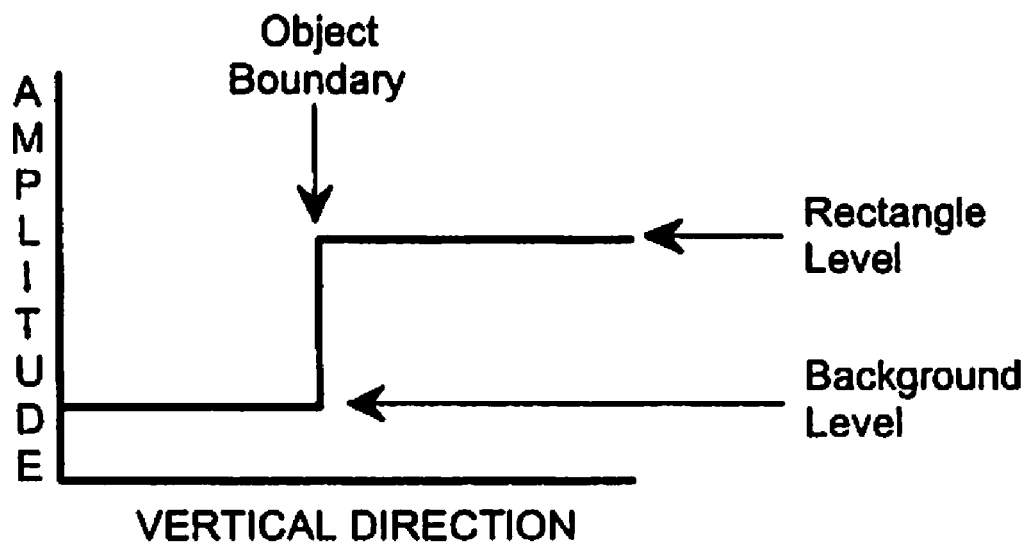
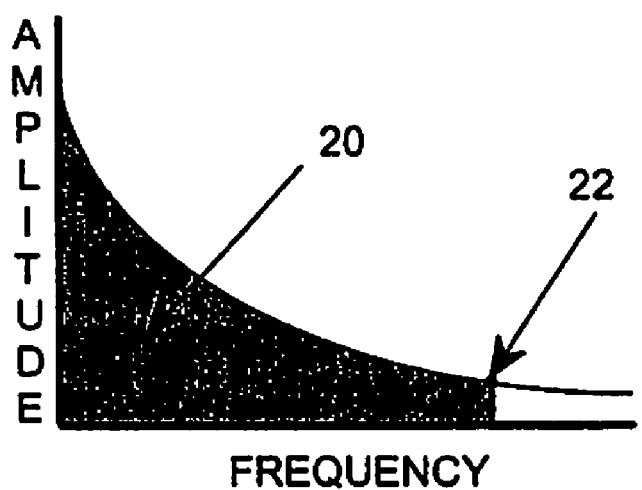

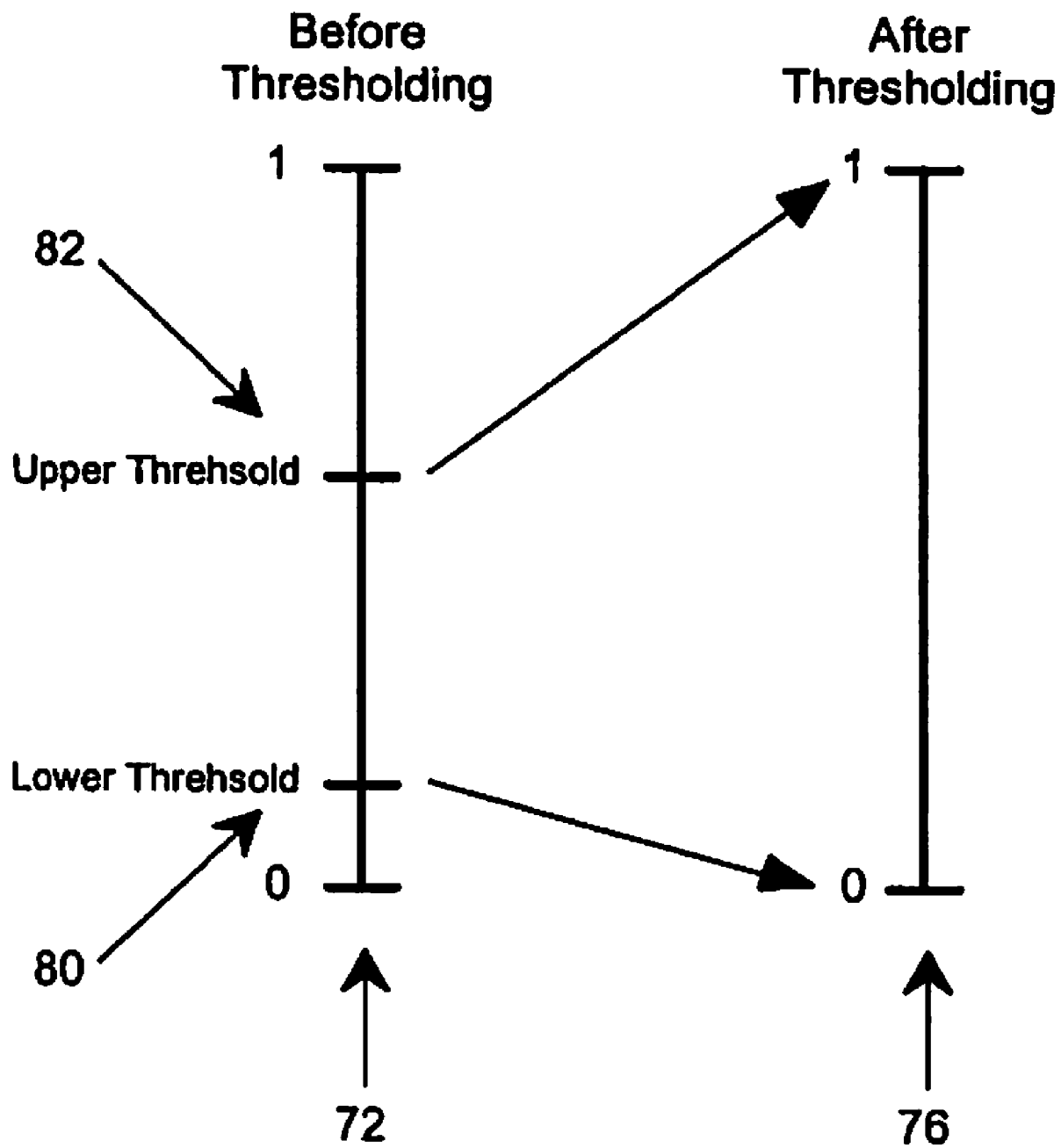

INTERLACE MOTION ARTIFACT DETECTION USING VERTICAL FREQUENCY DETECTION AND ANALYSIS

CROSS REFERENCE TO RELATED APPLICATIONS

The present application is a divisional of U.S. application Ser. No. 11/054,748 filed Feb. 9, 2005, now U.S. Pat. No. 7,391,481 which is a divisional of U.S. application Ser. No. 09/941,949 filed Aug. 28, 2001 entitled "Interlace Motion Artifact Detection Using Vertical Frequency Detection and Analysis" (now U.S. Pat. No. 6,909,469 issued Jun. 21, 2005) which is a continuation-in-part of U.S. patent application Ser. No. 09/372,713 filed Aug. 11, 1999 entitled "Method and Apparatus for Detection Frequency In Digital Video Images," (now U.S. Pat. No. 6,489,998 issued Dec. 3, 2002), which are incorporated herein by reference.

BACKGROUND OF THE INVENTION

1. Field of the Invention

The present invention relates generally to the processing of video images, and more particularly to techniques for deinterlacing video images.

2. Description of the Related Art

The world's major television standards use a raster scanning technique known as "interlacing." Interlaced scanning draws horizontal scan lines from the top of the screen to the bottom of the screen in two separate passes, one for even numbered scan lines and the other for odd numbered scan lines. Each of these passes is known as a field.

It is often necessary and/or desirable to convert an interlaced video signal to a progressively scanned signal. A single image or frame of a progressively scanned video source is scanned from the top of the screen to the bottom in a single pass. Such a conversion is advantageous, for example, when using a progressive scan display. Many of the display devices used to show interlaced video signals are actually progressive in nature. Common examples of such progressive displays are computer CRTs and liquid crystal displays (LCDs). One advantage of such displays is that they eliminate many of the deficiencies of interlaced video formats, such as flicker, line twitter, and visible scan line structure. Another advantage of the progressive scan format is improvement in the compression ratio of a digital format, such as a digital broadcast or satellite transmission.

In order for such an interlaced video image to be utilized by a progressively scanned video system, it must be converted from an interlaced scan format to a progressive scan format. There are a number of standard techniques for performing this conversion, and range from simple merging of adjacent fields, to interpolation from a single field to form a progressive frame, to more complex motion-adaptive techniques.

Motion-adaptive deinterlacing of interlaced video sequences is a method which optimizes image quality by utilizing different deinterlacing techniques in image areas with and without motion. Where there is no motion in an image, pixel data from adjacent interlaced fields can simply be merged to form a progressive frame since the two fields are effectively temporally consistent. However, where motion exists in the image, two adjacent fields cannot simply be combined without generating interlace motion artifacts since the fields are not temporally consistent in those areas (with motion). Instead, new pixels must be calculated based on the temporally 'current' field so that the entire output image is temporally consistent. Motion-adaptive deinterlacing merges these two approaches by combining data from two fields at image locations where there is no motion, and calculating new pixel data at image locations where there is motion. To do this, motion in the image must be detected on a pixel by pixel basis in order to decide which deinterlacing technique to apply at each pixel location.

Prior art in this field makes use of a number of techniques to detect image motion. A generally used method is to compute the difference between two fields. A significant difference is classified as 'motion'. One such method is to calculate the difference between spatially similar pixels in pairs of even fields and pairs of odd fields. (I.e., field pairs which are two field periods apart.) Another method calculates the difference between one field and a spatially coincident 'virtual' field which is created from a temporally adjacent but spatially non-coincident field. (I.e., the fields are one field period apart.)

The specific artifacts created by combining two fields with motion may also be detected. U.S. Pat. No. 5,625,421 discloses such a method, which detects "sawtooth" artifacts by testing sets of three vertically adjacent pixels for characteristics indicative of motion artifacts. Yet another method, disclosed in U.S. patent application Ser. No. 09/372,713, identifies motion artifacts by utilizing Fourier analysis to detect the presence of a specific vertical frequency which is characteristic of interlace motion artifacts. This prior art implementation of the identification of interlace motion artifacts looked only for a single frequency component. This frequency component is the maximum frequency ($f_{max}$) which can be represented by the vertical sampling rate of the video format—i.e., half the Nyquist sampling rate. The $f_{max}$ frequency was identified by performing a partial Discrete Fourier Transform (DFT) which calculated only the specific frequency component of interest in local area around a given pixel location. Essentially, this partial DFT multiplied a vertical array of pixel values by the amplitude of a cosine wave of the $f_{max}$ frequency, and then summed the results of the individual multiplications. The absolute value of this sum was used as the amplitude of the $f_{max}$ frequency component.

While the latter frequency-based method does detect interlace motion artifacts, it also has a potential shortcoming in that it also erroneously detects high frequencies in certain static image features as 'motion'. An example of this is illustrated in FIG. 1, which shows a simple example image 10 composed of a single rectangle 12 which has a different luminosity than the image background 14. The horizontally aligned borders 16 of the rectangle, when scanned in the vertical direction, appear as sharp transitions also known as a step function. An example of a step function is shown in FIG. 2, which also shows the frequency composition of such a step function. Although the step function is largely composed of lower frequencies 20, the specific frequency 22 which is characteristic of interlace motion artifacts is also present. Because this frequency is present in such images, it may be detected as a possible artifact, resulting in inaccurate detection. What is needed is a more accurate and reliable method of frequency detection which identifies interlace motion artifacts but rejects static image features which are not motion artifacts.

SUMMARY OF THE INVENTION

The present invention meets these needs by providing an accurate method and apparatus for reliably detecting interlace motion artifacts. It should be appreciated that the present invention and various discrete features thereof can be implemented in numerous ways, including as a process, an apparatus, a system, a device, or a method. Furthermore, various discrete apparatus of the invention can be implemented in software or hardware. Several inventive embodiments of the present invention are described below.

In one embodiment of the present invention, a method for detecting interlace motion artifacts is disclosed. The method includes detecting the presence of multiple vertical frequencies in an image, and analyzing the relative levels of those frequencies to derive an indication of the presence of motion artifacts. In addition, the overall image intensity is taken into account in the detection, with the indication of interlace motion artifacts being boosted in areas of low luminosity or chroma level.

In another embodiment of the present invention, a method for the detection of interlaced motion artifacts includes obtaining eight vertically aligned luma data samples, calculating a partial discrete fourier transform for a $f_{max}$ value, calculating a partial discrete fourier transform for a $f_{max}/2$ value and calculating a partial discrete fourier transform for a $f_{max}/4$ value.

In yet another embodiment of the present invention, a method for boosting frequency detection values in areas of low brightness and contrast is disclosed. The method includes obtaining a plurality of input pixel data values, determining a maximum value, determining a range value and selectively boosting a frequency detection value based upon the maximum value, the range value and a plurality of filtered frequency detection values.

In another embodiment of the present invention, a method for the prevention of false detection of interlace motion artifacts includes obtaining a plurality of $f_{max}$ frequency detection values, comparing the plurality of $f_{max}$ frequency detection values to a threshold and adjusting the plurality of $f_{max}$ frequency detection values based upon the comparison.

In another embodiment of the present invention, a system for the reduction of interlace motion artifacts by vertical frequency analysis is disclosed. The system includes a four-point partial discrete fourier transform module responsive to a set of four vertically aligned luma data sample inputs selected from and approximately centered about a set of eight vertically aligned luma data sample inputs and operative to develop a first frequency detection value. Also included is an eight-point partial discrete fourier transform module responsive to the set of eight vertically aligned luma data sample inputs and operative to develop a second, third and fourth frequency detection value. A dynamic range/maximum detection module responsive to the set of eight vertically aligned luma data sample inputs in conjunction with pixel data from a two-dimensional array surrounding a current input pixel and operative to develop a maximum data value and a range value. The horizontal lowpass filter module is responsive to the first, second, third and fourth frequency detection values and operative to develop filtered first, second, third and fourth frequency detection values. The detection value boost module is responsive to the filtered first, second, third and fourth frequency detection values, the maximum data value and the range value, and is operative to develop a level boosted four-point $f_{max}$ frequency detection value, a level boosted eight-point $f_{max}$ frequency detection value, a level boosted $f_{max}/2$ frequency detection value and a level boosted $f_{max}/4$ frequency detection value. An averaging module is responsive to the level boosted four-point frequency detection value and the level boosted eight-point frequency detection value, and is operative to develop a numeric average. A threshold comparison/level correction module is responsive to the numeric average, the level boosted $f_{max}/2$ frequency detection value and the level boosted $f_{max}/4$ frequency detection value, and is operative to develop a level-corrected $f_{max}$ frequency detection value. The horizontal weighted average module is responsive to the level-corrected $f_{max}$ frequency detection value and operative to develop a center-weighted horizontal frequency detection value. Finally, a threshold adjust module is responsive to the center-weighted horizontal frequency detection value and operative to develop a final frequency detection value.

The present invention advantageously allows for the reduction of artifacts in deinterlaced video images. By correctly and accurately identifying interlace motion artifacts, a video deinterlacer can combine pixels from two fields in areas which do not have motion artifacts and to process the image to remove motion artifacts in areas where such artifacts are present. The result is a progressive video image which is free of defects and motion artifacts. Further, the deinterlacing preserves the maximum amount of vertical detail in the image.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings wherein:

FIG. 2 illustrates time domain and frequency domain plots of the step function found at the vertical boundaries of certain image features;

FIG. 4 is an illustration used to describe the method of thresholding a frequency detection value of the present invention.

DETAILED DESCRIPTION OF THE PREFERRED EMBODIMENTS

A method and apparatus for accurate detection of interlace motion artifacts by vertical frequency analysis is disclosed. In the following description, numerous specific details are set forth in order to provide a thorough understanding of the present invention. It will be understood however that the present invention may be practiced without some or all of these specific details. In other instances, well known process operations have not been described in detail in order not to unnecessarily obscure the present invention.

Figure 1:
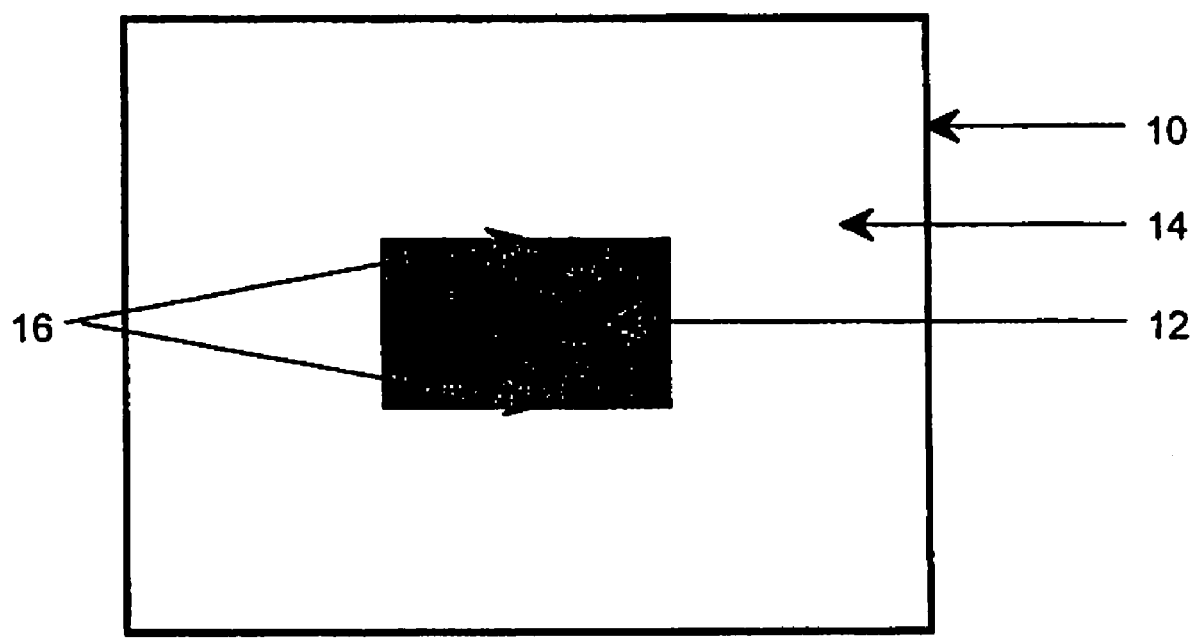
FIG. 1 illustrates an image which causes problems with a prior art method of identifying interlace motion artifacts via vertical frequency detection.
Figure 3:
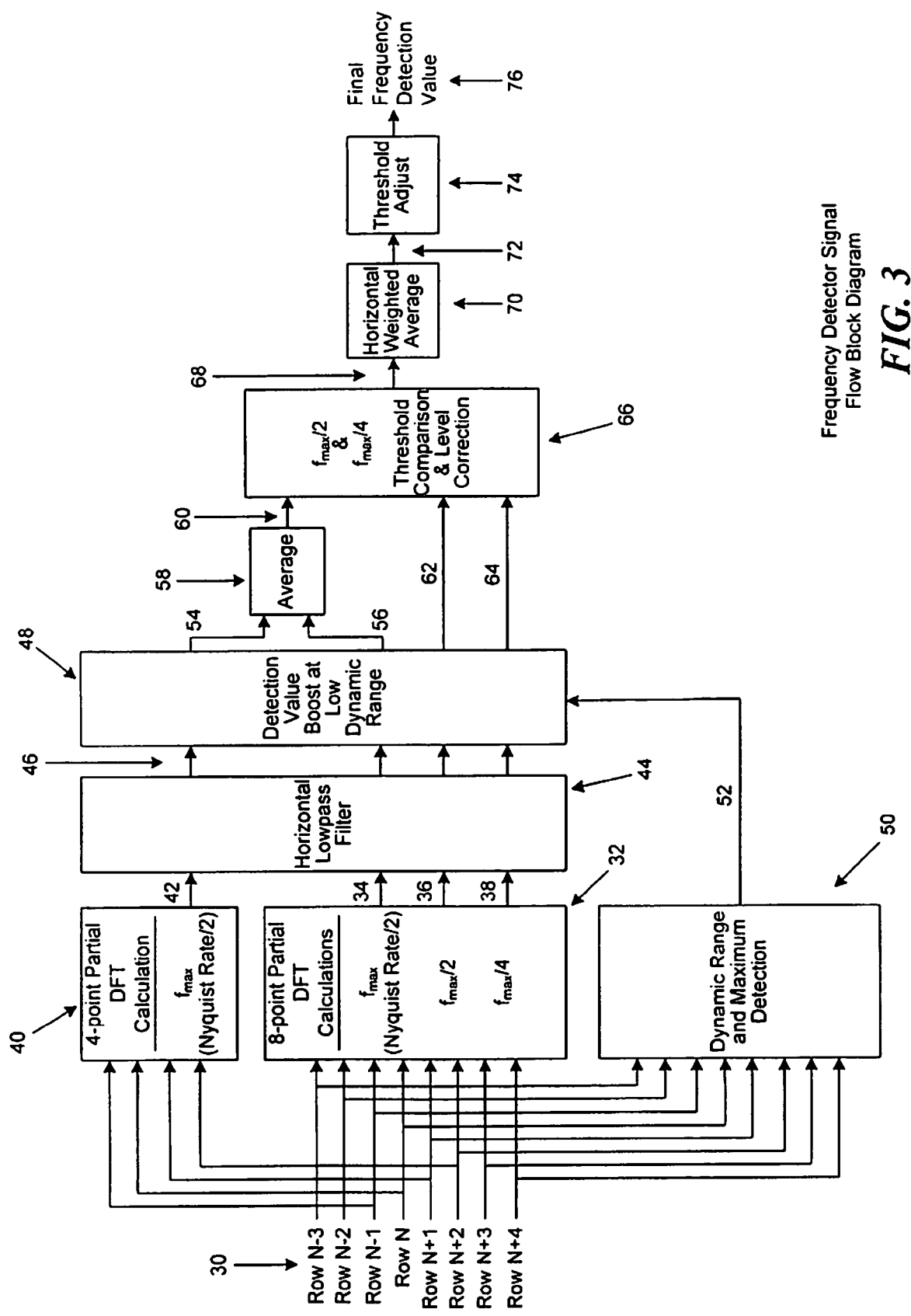
FIG. 3 illustrates a high level block diagram depicting the signal processing data path of the interlace motion artifact frequency detector of the present invention.

In a preferred embodiment of the invention, at each pixel location for which a detection of interlaced motion artifacts is needed, calculations for the detection of two specific lower frequencies are performed, along with two calculations for $f_{max}$ over two varying sample set sizes. A signal flow block diagram of the invention is shown in FIG. 3. Eight vertically aligned luma data samples 30 from a frame formed from the merging of two adjacent fields are the input to the frequency detector. The eight data samples are roughly centered around the pixel location for which the motion artifact detection is being performed (Row N in FIG. 3). Three eight-point partial DFT calculations 32 are performed, resulting in frequency amplitude level values 34, 36 and 38 for $f_{max}$, $f_{max}/2$, and $f_{max}/4$, respectively.

The three frequency detection calculations 32 are performed as follows. For a given frequency to be detected, the eight data sample values are each multiplied by the value of a complex sinusoid, or basis function, of the appropriate frequency. The basis function's value at a given pixel location is multiplied by that pixel's value. The resulting values are then summed to form a complex result for that frequency component. This process is essentially the calculation of a DFT for the single frequency. The magnitude of the sum is calculated and it represents the amplitude of the frequency at the given pixel location. The general form of the frequency calculation is:

$$F_k = \sum_{n=0}^{7} P_n e^{-j2\pi kn/8} \qquad \text{Equation 1}$$

where 'Fk' is the kth frequency component, 'n' is the pixel sample number, and 'Pn' is the value of the nth pixel. The complex exponential is the basis function for the kth frequency component, and is composed of a real cosine component and an imaginary sine component.

For example, the $f_{max}$ frequency component has the following basis function values for the eight data sample locations as set forth in Table one:

TABLE ONE

| | |
|---|---|
| cosine: | [1, −1, 1, −1, 1, −1, 1, −1] |
| sine:   | [0,  0, 0,  0, 0,  0, 0,  0] |

Note that the pixel data value for Row N−3 in FIG. 3 is assumed to be aligned with n=0. Since the value of the sine component is zero for all eight locations, only the cosine values need to be considered and the resulting frequency component value has no imaginary component. The magnitude calculation is therefore simplified to summing the eight multiplication results and taking the absolute value.

For the half and quarter $f_{max}$ frequency components, the basis function values are, respectively, as in Table Two:

TABLE TWO

| | |
|---|---|
| cosine: | [1. 0, −1,  0, 1, 0, −1,  0] |
| sine:   | [0, 1,  0, −1, 0, 1,  0, −1] |
| cosine: | [1, 0.7071, 0, −0.7071, −1, −0.7071,  0,  0.7071] |
| sine:   | [0, 0.7071, 1,  0.7071,  0, −0.7071, −1, −0.7071] |

Since the sine component is not zero for these two basis functions, the resultant frequency value will have an imaginary component. The magnitude calculation is then the traditional square root of the sum of the squares of the summed real and imaginary multiplications. For reduction of computational complexity and/or hardware implementation, an estimate of the magnitude may be calculated by taking the sum of the absolute values of the real and imaginary components. For similar reasons, the $f_{max}/4$ calculations may choose to use an approximation to the value of squareroot(2)/2 (i.e, 0.7071).

A second $f_{max}$ calculation 40 is performed which is based on four pixel data values, yielding a secondary $f_{max}$ frequency magnitude 42. The four-point frequency calculation is performed because empirical testing results have demonstrated that a combination of the four-point and eight-point $f_{max}$ detections yield more consistent results over a wide variety of source material. The frequency detection values 34, 36, 38 and 42 are then passed through a horizontal lowpass filter 44, producing filtered versions 46 of the input frequency detection values. This filtering process smooths out irregularities in the response of the pixel-by-pixel frequency detection values caused by noise and other problems. In the preferred embodiment, the lowpass filter is implemented as a simple averaging operation as follows:

$$\text{FilterOut} = (F_{n-2} + 2*F_{n-1} + 2*F_n + 2*F_{n+1} F_{n+2})/8 \qquad \text{Equation Three}$$

where $F_n$ is the current input frequency detection value to the filter, $F_{n-1}$ is the previous input frequency detection value, etc.

It will therefore be appreciated that a method for detecting interlace motion artifacts includes obtaining eight vertically aligned luma data samples, calculating a partial discrete fourier transform for a $f_{max}$ value, calculating a partial discrete fourier transform for a $f_{max}/2$ value and calculating a partial discrete fourier transform for a $f_{max}/4$ value. The method also includes obtaining four vertically aligned luma data samples, calculating a second $f_{max}$ value and passing the $f_{max}$ value, the $f_{max}/2$ value, the $f_{max}/4$ value and the second $f_{max}$ value though a filter resulting in a filtered $f_{max}$ value, a filtered $f_{max}/2$ value, a filtered $f_{max}/4$ value and a filtered second $f_{max}$ value. The filtered values are obtained by obtaining a first and second previous $f_{max}$ values, a current $f_{max}$ value and a next and second next $f_{max}$ values, doubling the first previous, current and next $f_{max}$ values, summing the doubled first previous, current and next $f_{max}$ values with the second previous and second next $f_{max}$ value and dividing the sum by 8.

The calculated frequency detection values are proportional to the range of the data from which they were calculated. Because of this, the frequency detection values will be relatively low in areas of low overall brightness and low contrast, and need to be boosted in these areas. To accomplish this, the eight input pixel data values 30 are also fed to a module 50 which determines the maximum data value and the range from maximum to minimum data values in a two-dimensional area surrounding the current pixel location. These results 52 are sent to a module 48 which also accepts as input the filtered frequency detection values 46 and boosts the level of the frequency detection values based on the pixel range and maximum values 52. The changes made to the frequency detection values are based on threshold parameters which are compared to the pixel data maximum and range values, as follows in Table Three:

TABLE THREE

| |
|---|
| IF      (Range < RangeThreshold1) AND (Max < MaxThreshold1) |
|     THEN multiply FrequencyDetectionValue by ScaleFactor1 |
| ELSE IF (Range < RangeThreshold2) AND (Max < MaxThreshold2) |
|     THEN multiply FrequencyDetectionValue by ScaleFactor2 |
| ELSE IF (Range < RangeThreshold3) AND (Max < MaxThreshold3) |
|     THEN multiply FrequencyDetectionValue by ScaleFactor3 |

This has the result of boosting the frequency detection values in areas of low overall intensity or dynamic range. In the preferred embodiment, the following default values, in a Table Four, are used for the thresholds and multipliers:

TABLE FOUR

| | | |
|---|---|---|
| RangeThreshold1 = 32 | MaxThreshold1 = 96  | ScaleFactor1 = 4 |
| RangeThreshold2 = 64 | MaxThreshold2 = 128 | ScaleFactor2 = 3 |
| RangeThreshold3 = 96 | MaxThreshold3 = 192 | ScaleFactor3 = 2 |

These values can be programmed, however, and varied as needed on an application by application basis.

It will therefore be appreciated that a method for detecting interlace motion artifacts includes detecting a presence of multiple vertical frequencies in an image, analyzing relative levels of the presence of multiple vertical frequencies and deriving an indication of a presence of motion artifacts. Also included is determining an overall measure of image intensity and dynamic range. The indication of the presence of motion artifacts is compensated in areas of low luminosity.

Also, it will be appreciated that a method for boosting frequency detection values in areas of low brightness and contrast includes obtaining a plurality of input pixel data values, determining a maximum value, determining a range value and selectively boosting a frequency detection value based upon the maximum value, the range value and a plurality of filtered frequency detection values. The selective boosting of a frequency detection value includes comparing the range value to a first range threshold, comparing the maximum value to a first maximum threshold, multiplying the frequency detection value by a first scale factor if the range value is less than the first range threshold and the maximum value is less than the first maximum threshold and taking no further action if the range value is less than the first range threshold and the maximum value is less than the first maximum threshold.

The method also includes comparing the range value to a second range threshold, comparing the maximum value to a second maximum threshold, multiplying the frequency detection value by a second scale factor if the range value is less than the second range threshold and the maximum value is less than the second maximum threshold and taking no further action if the range value is less than the second range threshold and the maximum value is less than the second maximum threshold. Also included is comparing the range value to a third range threshold, comparing the maximum value to a third maximum threshold, multiplying the frequency detection value by a third scale factor if the range value is less than the third range threshold and the maximum value is less than the third maximum threshold and taking no further action if the range value is less than the third range threshold and the maximum value is less than the third maximum threshold.

The level-boosted four-point $f_{max}$ frequency detection value 54 and level-boosted eight-point $f_{max}$ frequency detection value 56 are then combined in an averaging module 58 which computes the numeric average 60 of the two values. As noted above, the combination of the four-point and eight-point frequency detection values provides a more regular and consistent response across a variety of video program material.

When the lower frequency detection values are very strong compared to the $f_{max}$ detection, it is likely that a true interlace motion artifact is not present. To correct this, the composite $f_{max}$ frequency detection value 60 is sent to module 66 along with the level-boosted $f_{max}/2$ frequency detection value 62 and $f_{max}/4$ value 64. These values are compared to certain threshold parameters, and a multiple of the low frequency detection values is subtracted from the $f_{max}$ frequency detection value. In this manner, a strong detection of either or both of the lower frequencies causes the $f_{max}$ frequency detection value to be reduced in level, possibly to zero. A weaker detection of the lower frequencies will still reduce the level of the $f_{max}$ detection, but not to as great a degree, and will only reduce it to zero if the $f_{max}$ detection itself is very weak. The threshold and level modification logic is as follows in Table Five:

TABLE FIVE

IF ($f_{max}$ < LowFreqThreshold1)
    THEN subtract LowFreqScaleFactor1* $f_{max}/2$ from $f_{max}$
ELSE
    subtract LowFreqScaleFactor2* $f_{max}/2$ from $f_{max}$
IF ($f_{max}/4$ < LowFreqThreshold2)
    THEN subtract LowFreqScaleFactor3* $f_{max}/4$ from $f_{max}$
ELSE
    subtract LowFreqScaleFactor4* $f_{max}/4$ from $f_{max}$
IF ($f_{max}$ < 0)
    THEN set $f_{max}$ = 0

The final comparison to zero is necessary since the $f_{max}$ value may be negative after the two subtractions. In the preferred embodiment, the following default values, of Table Six, are used for the thresholds and multipliers:

TABLE SIX

| LowFreqThreshold1 = 32 | LowFreqScaleFactor1 = 8 |
|---|---|
|  | LowFreqScaleFactor2 = 4 |
| LowFreqThreshold2 = 200 | LowFreqScaleFactor3 = 32 |
|  | LowFreqScaleFactor4 = 24 |

These values can be programmed, however, and varied as needed on an application by application basis.

The level-corrected $f_{max}$ frequency detection value 68 is then filtered by module 70 which computes a center-weighted horizontal average frequency detection value 72. This has the effect of smoothly changing the frequency detection value near the boundaries of an area of interlace motion artifacts. A smooth, gradual change in the detection value is necessary to prevent a noticeable, abrupt change in the way new pixels are calculated. The weighted average is computed as follows in Equation 3:

$$HorWtdAvg=(F_{n-2}+2*F_{n-1}+8*F_n+2*F_{n+1}+F_{n+2})/8 \quad \text{Equation 3}$$

where $F_n$ is the current input frequency detection value to the center-weighted filter, $F_{n-1}$ is the previous input frequency detection value, etc.

It will therefore be appreciated that a method for the prevention of false detection of interlace motion artifacts includes obtaining a plurality of $f_{max}$ frequency detection values; comparing the plurality of $f_{max}$ frequency detection values to a threshold and adjusting the plurality of $f_{max}$ frequency detection values based upon the comparison. The plurality of $f_{max}$ frequency detection values includes a composite $f_{max}$ frequency detection value, a level-boosted $f_{max}/2$ frequency detection value and a level-boosted $f_{max}/4$ frequency detection value.

The composite $f_{max}$ frequency detection value is adjusted by comparing the composite $f_{max}$ frequency detection value to a first low frequency threshold multiplying a first low frequency scale factor by the level-boosted $f_{max}/2$ frequency detection value and subtracting from the composite $f_{max}$ frequency detection value if the composite $f_{max}$ frequency detection value is less than the first low frequency threshold and multiplying a second low frequency scale factor by the level-boosted $f_{max}/2$ frequency detection value and subtracting from the composite $f_{max}$ frequency detection value if the composite $f_{max}$ frequency detection value is greater than the first low frequency threshold.

The composite $f_{max}$ frequency detection value is also adjusted by comparing the level-boosted $f_{max}/4$ frequency detection value to a second low frequency threshold multiplying a third low frequency scale factor by the level-boosted $f_{max}/4$ frequency detection value and subtracting from the composite $f_{max}$ frequency detection value if the level-boosted $f_{max}/4$ frequency detection value is less than the second low frequency threshold and multiplying a fourth low frequency scale factor by the level-boosted $f_{max}/4$ frequency detection value and subtracting from the composite $f_{max}$ frequency detection value if the level-boosted $f_{max}/4$ frequency detection value is greater than the second low frequency threshold. The composite $f_{max}$ frequency detection value is set to zero if the composite $f_{max}$ frequency detection value is less than zero.

The composite $f_{max}$ frequency detection value is lowpass filtered. The lowpass filtering is achieved by obtaining a first and second previous $f_{max}$ values, the composite $f_{max}$ frequency detection value and a next and second next $f_{max}$ values, doubling the first previous, and next $f_{max}$ values, octupling the composite $f_{max}$ frequency detection value, summing the doubled first previous $f_{max}$ value, the doubled next $f_{max}$ value, the octupled $f_{max}$ frequency detection value with the second previous and second next $f_{max}$ value and dividing the sum by 8.

Finally, the filtered $f_{max}$ frequency detection value 72 is thresholded at programmable upper and lower limits. The thresholding act 74 is shown in greater detail as a graph in FIG. 4. Each pre-thresholded frequency detection value 72 is a number in the range zero to one. The post-thresholded values 76 also range from zero to one. The thresholding act sets all values below a lower threshold 80 to zero, and all values above an upper threshold 82 to one. Values between the upper and lower thresholds are expanded to fill the range zero to one. Thresholding can also be described by the following Equation 4:

$$TFD = (PTFD - LowThreshold)/UpperThreshold \quad \text{Equation 4}$$

where TFD is the thresholded frequency detection value 76, PTFD is the pre-thresholded frequency detection value 72, LowThreshold is the lower threshold 80, and UpperThreshold is the upper threshold 82. If the result of the threshold calculation is greater than one, the result is set to one; if the result is less than zero, the result is set to zero.

While the forgoing process has been described with respect to use of the luminance values of the video data, the same technique can be utilized with chroma data. This allows the present invention to detect the presence of interlace motion artifacts which are caused by chroma-only motion (i.e., where the luma level is constant but the chroma levels change).

It will therefore be appreciated that the frequency-based interlace motion artifact detection process of the present invention provides for improved image quality and the reduction of the presence of interlace motion artifacts. This is accomplished by a more accurate identification of the presence of interlace motion artifacts with fewer erroneous detections. The detection of multiple vertical frequencies along with level adjustments in areas of low brightness or contrast significantly improve the accuracy of the frequency detection process. The combination of these techniques provides a low artifact, high-resolution deinterlaced image.

It will also be appreciated that a system for the reduction of interlace motion artifacts by vertical frequency analysis includes a four-point partial discrete fourier transform module responsive to a set of four vertically aligned luma data sample inputs selected from and approximately centered about a set of eight vertically aligned luma data sample inputs and operative to develop a first frequency detection value. Also included is an eight-point partial discrete fourier transform module responsive to the set of eight vertically aligned luma data sample inputs and operative to develop a second, third and fourth frequency detection value. A dynamic range/maximum detection module responsive to the set of eight vertically aligned luma data sample inputs in conjunction with pixel data from a two-dimensional array surrounding a current input pixel and operative to develop a maximum data value and a range value. The horizontal lowpass filter module is responsive to the first, second, third and fourth frequency detection values and operative to develop filtered first, second, third and fourth frequency detection values. The detection value boost module is responsive to the filtered first, second, third and fourth frequency detection values, the maximum data value and the range value, and is operative to develop a level boosted four-point $f_{max}$ frequency detection value, a level boosted eight-point $f_{max}$ frequency detection value, a level boosted $f_{max}/2$ frequency detection value and a level boosted $f_{max}/4$ frequency detection value. An averaging module is responsive to the level boosted four-point frequency detection value and the level boosted eight-point frequency detection value, and is operative to develop a numeric average. A threshold comparison/level correction module is responsive to the numeric average, the level boosted $f_{max}/2$ frequency detection value and the level boosted $f_{max}/4$ frequency detection value, and is operative to develop a level-corrected $f_{max}$ frequency detection value. The horizontal weighted average module is responsive to the level-corrected $f_{max}$ frequency detection value and operative to develop a center-weighted horizontal frequency detection value. Finally, a threshold adjust module is responsive to the center-weighted horizontal frequency detection value and operative to develop a final frequency detection value.

While this invention has been described in terms of several preferred embodiments, it will be appreciated that those skilled in the art, upon reading the preceding specifications and studying the drawings, will realize various alterations, additions, permutations, and equivalents as fall within the true spirit and scope of the invention.

I claim:

1. A system for the reduction of interlace motion artifacts by vertical frequency analysis comprising:

a) a four-point partial discrete fourier transform module responsive to a set of four vertically aligned luma or chroma data sample inputs selected from and approximately centered about a set of eight vertically aligned luma or chroma data sample inputs and operative to develop a first frequency detection value;

b) an eight-point partial discrete fourier transform module responsive to the set of eight vertically aligned luma or chroma data sample inputs and operative to develop a second, third and fourth frequency detection value;

c) a dynamic range/maximum detection module responsive to the set of eight vertically aligned luma or chroma data sample inputs in conjunction with pixel data from a two-dimensional array surrounding a current input pixel and operative to develop a maximum data value and a range value;

d) a horizontal lowpass filter module responsive to the first, second, third and fourth frequency detection values and operative to develop filtered first, second, third and fourth frequency detection values;

e) a detection value boost module responsive to the filtered first, second, third and fourth frequency detection values, the maximum data value and the range value, operative to develop a level boosted four-point $f_{max}$ frequency detection value, a level boosted eight-point $f_{max}$ frequency detection value, a level boosted $f_{max}/2$ frequency detection value and a level boosted $f_{max}/4$ frequency detection value;

f) an averaging module responsive to the level boosted four-point frequency detection value and the level boosted eight-point frequency detection value, operative to develop a numeric average;

g) a threshold comparison/level correction module responsive to the numeric average, the level boosted $f_{max}/2$ frequency detection value and the level boosted $f_{max}/4$ frequency detection value, operative to develop a level-corrected $f_{max}$ frequency detection value;

h) a horizontal weighted average module responsive to the level-corrected $f_{max}$ frequency detection value and operative to develop a center-weighted, horizontal frequency detection value; and i) a threshold adjust module responsive to the center-weighted horizontal frequency detection value and operative to develop a final frequency detection value.

2. A system as in claim 1, wherein the luma or chroma data is luma data.

3. A system as in claim 1, wherein the luma or chroma data is chroma data.

4. A system as in claim 1, wherein the luma or chroma data comprises luma data and chroma data.

5. A method for the reduction of interlace motion artifacts by vertical frequency analysis, the method comprising:

a) performing a four-point partial discrete Fourier transform responsive to a set of four vertically aligned luma or chroma data sample inputs selected from and approximately centered about a set of eight vertically aligned luma data sample inputs and generating a first frequency detection value;

b) performing an eight-point partial discrete Fourier transform responsive to the set of eight vertically aligned luma or chroma data sample inputs and generating a second, third, and fourth frequency detection value;

c) performing a dynamic range/maximum detection operation responsive to the set of eight vertically aligned luma or chroma data sample inputs in conjunction with pixel data from a two-dimensional array surrounding a current input pixel and generating a maximum data value and a range value;

d) performing a horizontal low-pass filter operation responsive to the first, second, third, and fourth frequency detection values and generating filtered first, second, third, and fourth frequency detection values;

e) performing a detection value boost operation responsive to the filtered first, second, third, and fourth frequency detection values, the maximum data value and the range value, and generating a level boosted four-point $f_{max}$ frequency detection value, a level boosted eight-point $f_{max}$ frequency detection value, a level boosted $f_{max}/2$ frequency detection value, and a level boosted $f_{max}/4$ frequency detection value;

f) performing an averaging operation responsive to the level boosted four-point frequency detection value and the level boosted eight-point frequency detection value, and generating a numeric average;

g) performing a threshold comparison/level correction operation responsive to the numeric average, the level boosted $f_{max}/2$ frequency detection value, and the level boosted $f_{max}/4$ frequency detection value, and generating a level-corrected $f_{max}$ frequency detection value;

h) performing a horizontal weighted average operation responsive to the level-corrected $f_{max}$ frequency detection value and generating a center-weighted, horizontal frequency detection value; and i) performing a threshold adjust operation responsive to the center-weighted horizontal frequency detection value and generating a final frequency detection value.

6. A method as in claim 5, wherein the luma or chroma data is luma data.

7. A method as in claim 5, wherein the luma or chroma data is chroma data.

8. A method as in claim 5, wherein the luma or chroma data comprises luma data and chroma data.

9. A system for the reduction of interlace motion artifacts comprising:

a) a partial discrete Fourier transform module responsive to a set of vertically aligned luma or chroma data sample inputs selected from and approximately centered about a set of vertically aligned luma or chroma data sample inputs and operative to develop a first frequency detection value;

b) a partial discrete Fourier transform module responsive to the set of vertically aligned luma or chroma data sample inputs and operative to develop a plurality of additional frequency detection values;

c) a dynamic range/maximum detection module responsive to the set of vertically aligned luma or chroma data sample inputs in conjunction with pixel data from a two-dimensional array surrounding a current input pixel and operative to develop a maximum data value and a range value;

d) a horizontal lowpass filter module responsive to the frequency detection values and operative to develop filtered frequency detection values;

e) a detection value boost module responsive to the filtered frequency detection values, the maximum data value and the range value, operative to develop a plurality of level boosted frequency detection values;

f) an averaging module responsive to the level boosted frequency detection values, operative to develop a numeric average;

g) a threshold comparison/level correction module responsive to the numeric average, at to at least one of the level boosted frequency detection values operative to develop a level-corrected frequency detection value;

h) a horizontal weighted average module responsive to the level-corrected frequency detection value and operative to develop a center-weighted, horizontal frequency detection value; and i) a threshold adjust module responsive to the center-weighted horizontal frequency detection value and operative to develop a final frequency detection value.

10. A method for the reduction of interlace motion artifacts comprising:

a) performing a partial discrete Fourier transform responsive to a set of vertically aligned luma or chroma data sample inputs selected from and approximately centered about a set of vertically aligned luma or chroma data sample inputs and generating a first frequency detection value;

b) performing a partial discrete Fourier transform operation responsive to the set of vertically aligned luma or chroma data sample inputs and generating a plurality of additional frequency detection values;

c) performing a dynamic range/maximum detection operation responsive to the set of vertically aligned luma or chroma data sample inputs in conjunction with pixel data from a two-dimensional array surrounding a current input pixel and generating a maximum data value and a range value;

d) performing a horizontal low-pass filter operation responsive to the frequency detection values and generating filtered frequency detection values;

e) performing a detection value boost operation responsive to the filtered frequency detection values, the maximum data value and the range value, generating a plurality of level boosted frequency detection values;

f) performing an averaging operation responsive to the level boosted frequency detection values, operative to develop a numeric average;

g) performing a threshold comparison/level correction operation responsive to the numeric average, at to at least one of the level boosted frequency detection values generating a level-corrected frequency detection value;

h) performing a horizontal weighted average operation responsive to the level-corrected frequency detection value and generating a center-weighted, horizontal frequency detection value; and i) performing a threshold adjust operation responsive to the center-weighted horizontal frequency detection value and generating a final frequency detection value.

11. A method as in claim 10, wherein the luma or chroma data is luma data.

12. A method as in claim 10, wherein the luma or chroma data is chroma data.

13. A method as in claim 10, wherein the luma or chroma data comprises luma data and chroma data.

14. A Fourier transform unit comprising:

a four-point partial discrete Fourier transform module; and an eight-point partial discrete Fourier transform module;

the four-point partial discrete Fourier transform module being responsive to a set of vertically aligned luma or chroma data sample inputs selected from and approximately centered about a set of vertically aligned luma or chroma data sample inputs and operative to develop a first frequency detection value; and the eight-point partial discrete Fourier transform module being responsive to the set of eight vertically aligned luma or chroma data sample inputs and operative to develop at least one frequency detection value.

15. The Fourier transform unit in claim 14, wherein:

the four-point partial discrete Fourier transform module being responsive to a set of four vertically aligned luma or chroma data sample inputs selected from and approximately centered about a set of eight vertically aligned luma or chroma data sample inputs and operative to develop a first frequency detection value; and the eight-point partial discrete Fourier transform module being responsive to the set of eight vertically aligned luma or chroma data sample inputs and operative to develop a second, third and fourth frequency detection value.

16. The Fourier transform unit in claim 15, further comprising:

a dynamic range/maximum detection module responsive to the set of eight vertically aligned luma or chroma data sample inputs in conjunction with pixel data from a two-dimensional array surrounding a current input pixel and operative to develop a maximum data value and a range value;

a horizontal lowpass filter module responsive to the first, second, third and fourth frequency detection values and operative to develop filtered first, second, third and fourth frequency detection values; and a detection value boost module responsive to the filtered first, second, third and fourth frequency detection values, the maximum data value and the range value, operative to develop a level boosted four-point $f_{max}$ frequency detection value, a level boosted eight-point $f_{max}$ frequency detection value, a level boosted $f_{max}/2$ frequency detection value and a level boosted $f_{max}/4$ frequency detection value.

* * * * *